United States Patent

Dean

[11] Patent Number: 6,123,191
[45] Date of Patent: Sep. 26, 2000

[54] COMPACT DISK HOLDER

[76] Inventor: Vincent W. Dean, 217 Main St., Hyannis, Mass. 02601

[21] Appl. No.: 09/228,353

[22] Filed: Jan. 11, 1999

[51] Int. Cl.[7] .................................................. B65D 85/57
[52] U.S. Cl. ........................................ 206/310; 206/308.1
[58] Field of Search ....................... 206/308.1, 309–313, 206/493, 460

[56] References Cited

U.S. PATENT DOCUMENTS

| | | | |
|---|---|---|---|
| 4,736,840 | 4/1988 | Deiglmeier | 206/309 |
| 4,948,022 | 8/1990 | VanDyke . | |
| 4,951,826 | 8/1990 | Tomkins . | |
| 5,040,687 | 8/1991 | Whittington . | |
| 5,105,952 | 4/1992 | Krattiger . | |
| 5,332,089 | 7/1994 | Tillett et al. | 206/310 |
| 5,533,614 | 7/1996 | Walker | 206/310 |
| 5,570,791 | 11/1996 | Sommi . | |
| 5,590,827 | 1/1997 | Nimpoeno . | |
| 5,593,030 | 1/1997 | Tell . | |
| 5,609,258 | 3/1997 | Spector . | |
| 5,653,364 | 8/1997 | Eskandry . | |
| 5,685,427 | 11/1997 | Kuitems et al. . | |
| 5,697,496 | 12/1997 | Bauer | 206/310 |
| 5,779,040 | 7/1998 | Attar et al. | 206/310 |
| 5,950,822 | 9/1999 | Cloran et al. | 206/308.1 |

*Primary Examiner*—Paul T. Sewell
*Assistant Examiner*—Luan K. Bui
*Attorney, Agent, or Firm*—John P. McGonagle

[57] ABSTRACT

A compact disk holder in the shape of a flat disk made from a resilient material and including a central resilient hub and a felt backing for cushioning the compact disk. One side of the invention holder has an adhesive coating protected by a non-adhesive, peelable cover. Upon removal of the peelable cover, the holder may then be adhesively attached to a vehicle visor, wall, window, or any other desired surface location. The compact disk is then pressed onto the holder where it is fixedly held and accessible without fear of damage when removed.

4 Claims, 4 Drawing Sheets

COMPACT DISK HOLDER

BACKGROUND OF THE INVENTION

This invention relates to holders, and more particularly to a holder for a compact disk.

Compact disks are fast becoming the medium of preference for the recording and performance of music, as well as for storage and access of data by computers. A compact disk is a flat, thin, metallic disk having optically readable information, such as music, computer software and data or multimedia. The compact disk has a diameter of approximately 4.7 inches.

Compact disks usually come in a small storage case made from a hard plastic which protects the disk when not in use. The compact disk storage case has a hinged front door which pivots to one side to allow removal of the compact disk by manipulation of the case holder. The storage case will usually have a central holder providing a circular recess to accept the compact disk. At the center of the circular recess, a plastic hub is formed in the disk holder.

A compact disk is substantially smaller than a prior art phonograph record. Because of the small size of compact disks, portable and vehicle-installed compact disk players are popular. Therefore, a compact disk storage apparatus that allows for either quick removal and replacement of the compact disk alone, when a compact disk player is nearby is preferable. Conventionally, when a compact disk is to be used, the case holding that particular disk must be located, removed from its stored position, opened, the case holder manipulated, the disk removed and placed into the device reading/playing the disk, and the case then placed in some type of temporary storage location. Since the case and built-in disk holder is generally made from a hard plastic, the user will often experience difficulty removing the disk from the holder. Although the conventional compact disk case provides excellent protection from external forces, there is a tendency for the compact disk's optically-read surface to be contacted, scratched and damaged during removal from the case. This is especially true for a compact disk that is frequently used, or used in an environment which is inconvenient for removal of a compact disk from a case with one hand such as an automobile, truck, van, boat, or other vehicle.

SUMMARY OF THE INVENTION

The present invention provides an inexpensive and easy to use compact disk holder for temporary access, frequent access or access in inconvenient physical locations, such as vehicles. The present invention compact disk holder is a flat disk made from a resilient material and includes a central resilient hub and a felt backing for cushioning the compact disk. One side of the invention holder has an adhesive coating protected by a non-adhesive, peelable cover. Upon removal of the peelable cover, the holder may then be adhesively attached to a vehicle visor, wall, window, or any other desired surface location. The compact disk is then pressed onto the holder where it is fixedly held and accessible without fear of damage when removed.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 2:
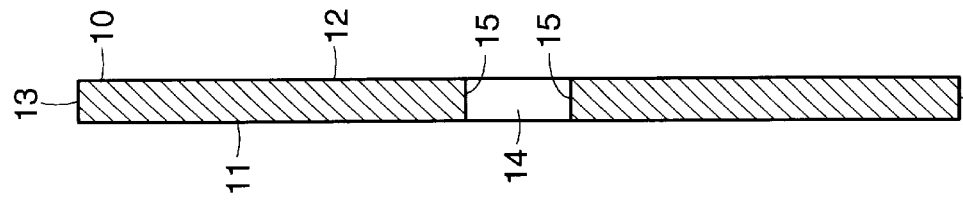
FIG. 2 is a cross-sectional view of the compact disk of FIG. 1 along the line 2—2 in FIG. 1.
Figure 1:
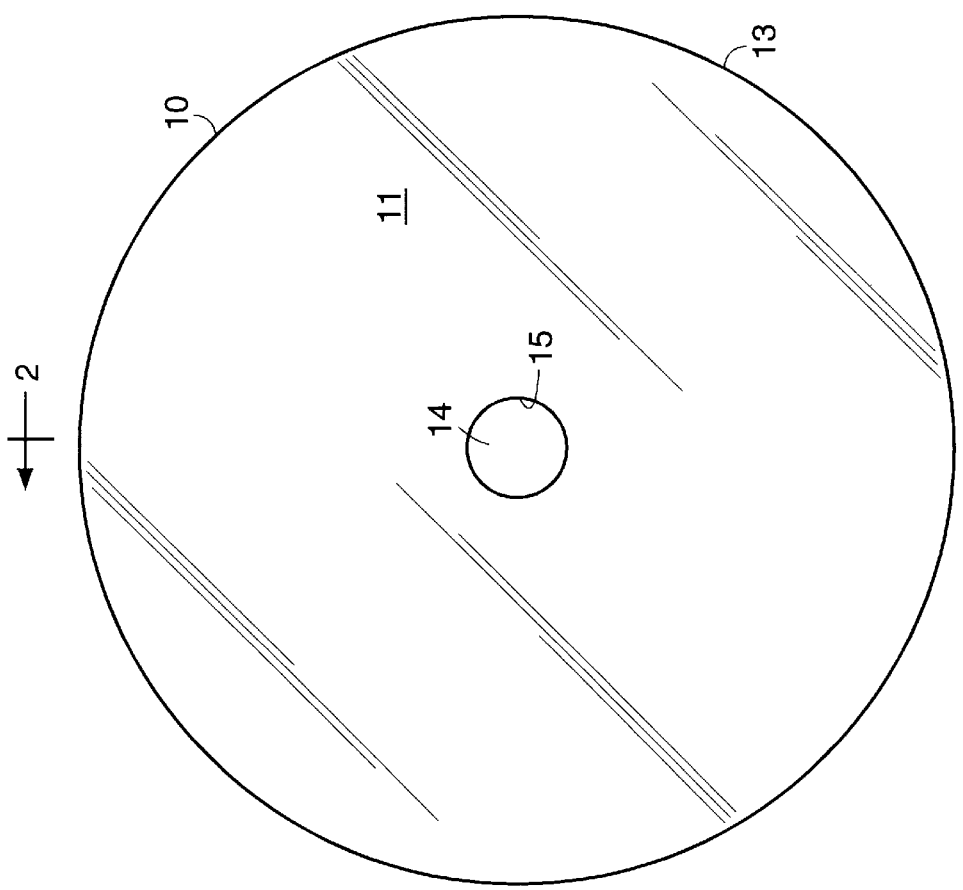
FIG. 1 is a front view of a compact disk.
Figure 4:
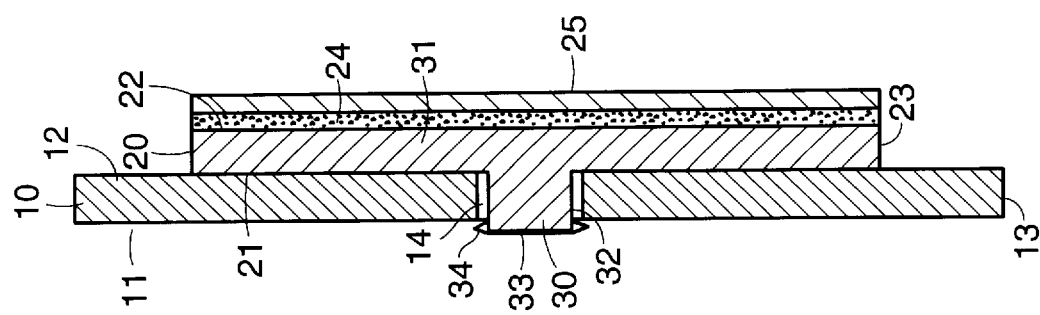
FIG. 4 is a cross-sectional view of the holder of FIG. 3 along the line 4—4 in FIG. 3.
Figure 3:
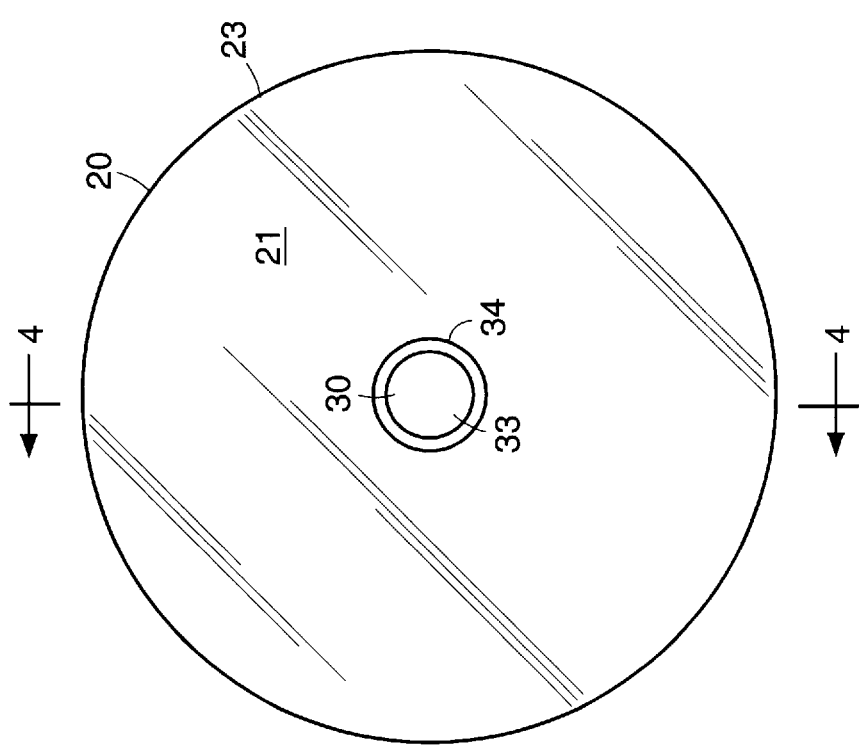
FIG. 3 is a front view of a compact disk holder according to the principles of the present invention.
Figure 5:
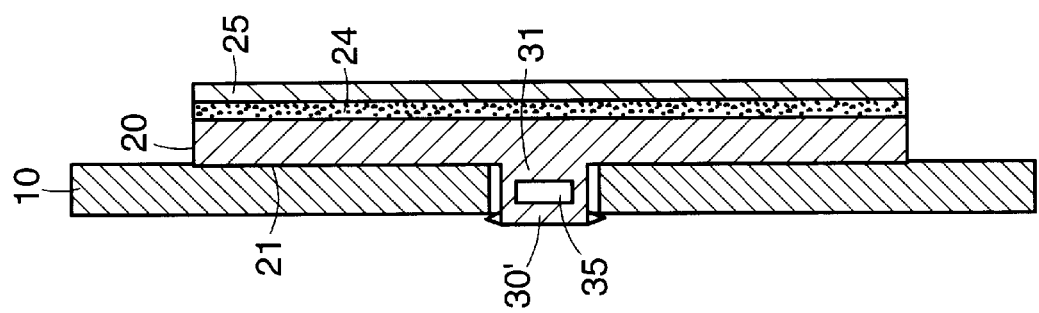
FIG. 5 is a cross-sectional view of another embodiment of the holder of FIG. 3.
Figure 6:
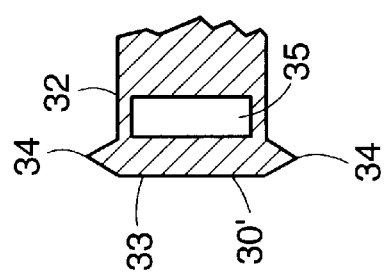
FIG. 6 is an expanded view, partly in section, of another embodiment of the central hub of the holder.
Figure 8:
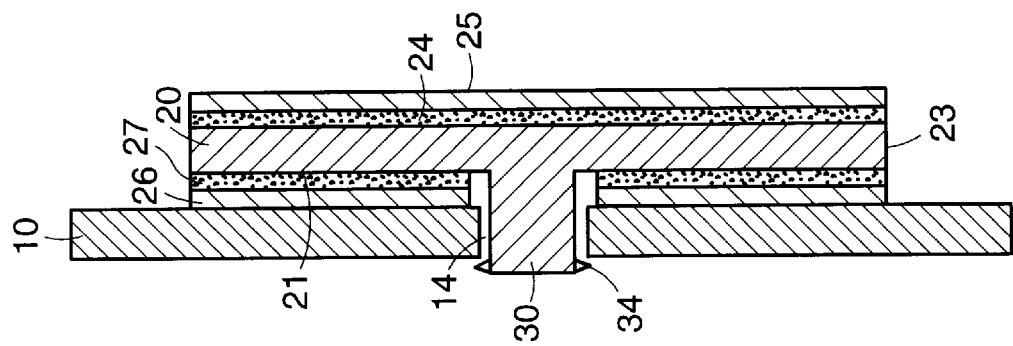
FIG. 8 is a cross-sectional view of the holder of FIG. 7 along the line 8—8 in FIG. 7.
Figure 7:
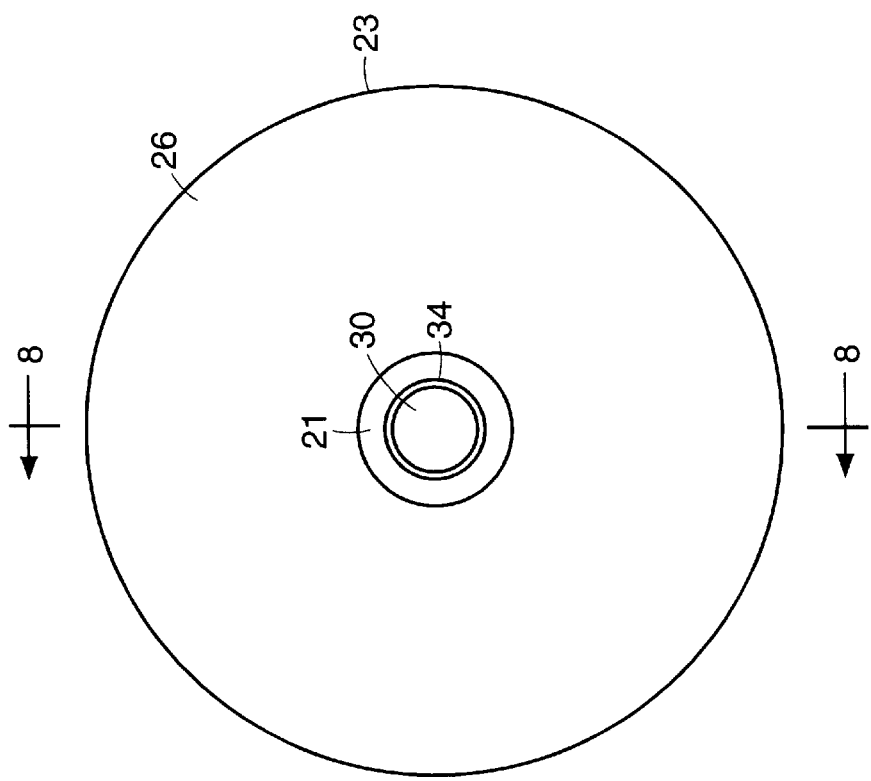
FIG. 7 is a front view of a another embodiment of the compact disk holder according to the principles of the present invention.

Referring to the drawings in detail wherein like elements are indicated by like numerals, there is shown a compact disk holder 20 constructed according to the principles of the present invention. A typical compact disk 10 is shown in FIGS. 1 and 2, and is of the type having a front surface 11, a rear surface 12, an outer periphery 13, and a round, central opening 14 having an inwardly facing circular edge 15. The compact disk 10 is round and will typically have an outer periphery diameter of 4.7 inches. The central opening 14 will typically have a diameter of 0.6 inches.

Referring more particularly to FIGS. 3–8, there is shown a compact disk holder 20 constructed according to the principles of the invention. The holder 20 has a front surface 21, a rear surface 22, an outer periphery 23, and a central hub 30. The holder 20 is round and will typically have an outer periphery diameter of from two to three inches. The hub 30 is also round and will have a diameter greater than 0.6 inches. The holder 20 is made from a resilient, non-abrasive material such as a soft rubber. The holder rear surface 22 has an adhesive coating 24 applied thereto. The adhesive coating 24 has a peelable cover material 25 such as paper attached to the coating 24.

In one embodiment of the invention, the hub 30 protrudes from the center of the holder front surface 21, said front surface center forming a bottom 31 from which cylindrical side walls 32 extend vertically outward, said hub protuberance being generally cylindrical in shape, the longitudinal axis of said cylindrical protuberance being generally perpendicular to the bottom 31 of said protuberance, said protuberance having a top 33 connected to said cylindrical side walls 32. The hub top 33 has a circular flange 34 extending radially outward from the top 33 and side walls 32 in a plane generally parallel to the holder front surface 21. The hub protuberance 30 is made entirely from the same material as the holder 20. See FIGS. 3 and 4.

In another embodiment of the invention, the hub 30' is hollow. The hub top 33, side walls 32 and bottom 31 define a hollow interior 35. See FIGS. 5 and 6.

In another embodiment of the invention, a thin layer of felt-like material 26 is attached to the front surface 21 of the holder 20 for additional cushioning of the compact disk 10. The layer of felt 26 may have a coating of adhesive with a protective cover material (not shown) to provide a user with an optional cushioning capability. See FIGS. 7 and 8.

In operation, the desired location for the holder 20 is selected. The cover material 25 is peeled off and the holder 20 is attached to the desired surface, rear surface 22 first. A compact disk 10 may then me attached to the holder 20 by sliding the compact disk central opening 14 over the holder hub 30. The hub 30 is made from resilient material and the flange 34 will bend toward the holder front surface 21 allowing the compact disk central opening edge 15 to slide over the hub 30. The flange 34 will then spring back into position after the compact disk central opening 14 is slid over the flange 34 thereby holding the compact disk 10 in place against the holder front surface 21. Where it is desirable to use a stiffer material for the hub 30, the hollow hub 30' shown in FIGS. 5 and 6, may be used. By pressing directly into the hub top 33, the hub top 33 will collapse into the interior 35 pulling the flange 34 radially inward. This will provide enough clearance to insert the compact disk 10 over the hub flange 34 against the holder front surface 21. Where extra cushioning for the compact disk 10 is desirable, the thin layer of felt 26 may be first adhesively applied 27 to the holder front surface 21. The felt 26 may be used with either version of the hub 30, 30'.

It is understood that the above-described embodiments are merely illustrative of the application. Other embodiments may be readily devised by those skilled in the art which will embody the principles of the invention and fall within the spirit and scope thereof.

I claim:

1. A holder for holding a round compact disk having a front surface, a rear surface, an outer periphery, and a round, central opening having an inwardly facing circular edge, comprising:

a flat, resilient, smooth disk-shaped member having a front surface with a round, central, resilient hub, a substantially planar rear surface having an adhesive coating protected by a non-adhesive, peelable cover, and an outer periphery;

wherein said hub protrudes from the center of the member front surface, said front surface center forming a bottom from which cylindrical hub side walls extend outward, said hub protuberance being generally cylindrical in shape, said hub protuberance having a longitudinal axis generally perpendicular to the member front surface, said hub protuberance having a top connected to said cylindrical side walls;

wherein said hub top has a circular flange extending radially outward from the side walls in a plane generally parallel to the member front surface;

wherein said hub top, side walls and bottom define a fully enclosed hollow interior.

2. A holder as recited in claim 1, wherein:

the hub protuberance is made from the same material as the holder.

3. A holder as recited in claim 2, further comprising:

a thin layer of cushioning material with a central hole attached to the front surface of the holder.

4. A holder as recited in claim 2, further comprising:

a thin layer of cushioning material with a central hole adapted for attachment to the front surface of the holder, said material having a coating of adhesive with a protective cover material.

* * * * *